(12) United States Patent
Barber

(10) Patent No.: US 7,828,475 B2
(45) Date of Patent: Nov. 9, 2010

(54) MOTORCYCLE ENGINE BLENDER STATION

(76) Inventor: Danny Barber, 27602 SE. Highway 224, Eagle Creek, OR (US) 97022-8713

( * ) Notice: Subject to any disclaimer, the term of this patent is extended or adjusted under 35 U.S.C. 154(b) by 551 days.

(21) Appl. No.: 11/974,388

(22) Filed: Oct. 13, 2007

(65) Prior Publication Data

US 2009/0097353 A1 Apr. 16, 2009

(51) Int. Cl.
*A47J 43/046* (2006.01)
*A47J 43/08* (2006.01)
(52) U.S. Cl. .................. 366/198; 366/205; 366/314
(58) Field of Classification Search ........... 366/197, 366/198, 199, 205, 206, 314; 99/348; 241/282.1–282.2
See application file for complete search history.

(56) References Cited

U.S. PATENT DOCUMENTS

| | | | | |
|---|---|---|---|---|
| 2,526,351 | A * | 10/1950 | Grubelic | 366/198 |
| 2,603,461 | A * | 7/1952 | Shwayder et al. | 366/251 |
| 2,757,910 | A * | 8/1956 | O'Neill | 366/247 |
| 2,802,649 | A * | 8/1957 | Stockton | 366/197 |
| 2,923,438 | A * | 2/1960 | Logan | 222/2 |
| 2,965,363 | A * | 12/1960 | Worden | 366/197 |
| 2,985,587 | A * | 5/1961 | Hoch et al. | 210/637 |
| 3,118,653 | A * | 1/1964 | Dedoes | 366/200 |
| 4,061,315 | A * | 12/1977 | Eitzen et al. | 366/111 |
| 4,153,374 | A * | 5/1979 | Adams | 366/208 |
| 5,160,198 | A * | 11/1992 | Fillon | 366/198 |
| 5,921,679 | A * | 7/1999 | Muzzio et al. | 366/348 |
| 5,938,329 | A * | 8/1999 | Reeder | 366/206 |
| 6,758,426 | B2 * | 7/2004 | Have | 241/30 |
| 7,665,887 | B2 * | 2/2010 | Morris, Jr. et al. | 366/262 |

* cited by examiner

*Primary Examiner*—Charles E Cooley
(74) *Attorney, Agent, or Firm*—Clement Cheng

(57) ABSTRACT

A blended drink concession apparatus has a motorcycle engine, mounted in a motorcycle engine display area. The motorcycle belt is powered by the motorcycle engine and the motorcycle pulley is also powered by the motorcycle engine. The motorcycle pulley operates a shaft and the shaft operates a belt. The belt operates the blender shaft. The blender connector is powered by the blender shaft. A variety of hundred jars each having a blender blade is powered by the blender shaft connector. Thus, users can have blended drinks from the power of a motorcycle engine. Optionally, propane can be injected into the exhaust and ignited for visual effect. Optionally, handlebars mounted in front of the engine provide additional decoration. The motorcycle handlebars may have gearshift control, start and kill switch or other controls. The blended drink concession apparatus is mounted on a trailer that can be pulled around from event to event.

16 Claims, 1 Drawing Sheet

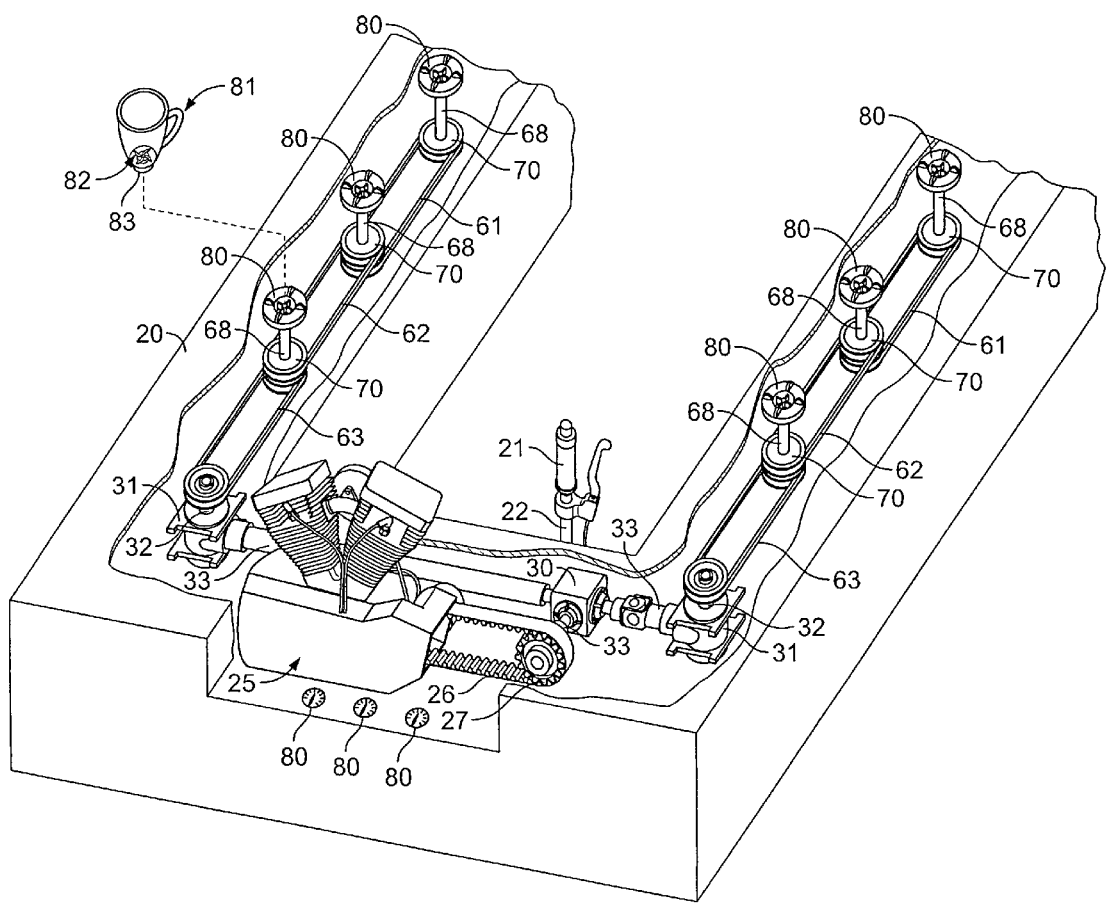

MOTORCYCLE ENGINE BLENDER STATION

DISCUSSION OF RELATED ART

During a hot summer, one of America's pastimes is to take a road trip on a motorcycle. Many motorcycle enthusiasts go to a variety of shows and motorcycle enthusiast gatherings. Recently, these gatherings have become larger and more commercialized with corporate sponsors attending. A variety of different motorcycles sometimes have their own enthusiast gatherings which are sometimes model and make specific.

Motorcycle enthusiast gatherings can be a fun social event. Unfortunately, most motorcycles do not have a large carrying capacity for carrying traditional tailgate style picnic equipment such as coolers for ice and food, BBQ grills, and blenders for blended drinks. Therefore, concession vendors supply most of the food and drink needs for the gatherings.

At all of these gatherings, there are many hungry people desiring food and many thirsty people desiring blended drinks. The blended drinks are traditionally made from a variety of independent blender jars mounted on electrically powered blender motors. A typical beverage concession station would have a number of blenders. Unfortunately, these blenders are not very entertaining, they are loud, with some emitting very annoying high-pitched noises. Furthermore, blenders are commonplace and mundane. Also, many of the blenders are underpowered in proportion to the amount of annoying noise that they make. Sometimes traditional blenders do not chop up all the ice or other ingredients, sometimes leaving chunks. Thus, one of the objects of this invention is to provide a more pleasant and entertaining blended drink experience, yet not have an underpowered blender.

SUMMARY OF THE INVENTION

The present invention is a stock motorcycle engine powered blended drink station that is preferably mounted on a trailer for superior mobility. A motorcycle engine such as a standard Harley-Davidson five-speed motorcycle engine is mounted on the counter for display and the output of the engine is mechanically connected to the blades of the blender jars. Thus, the gas pistons of the motorcycle engine directly power the blade rotation in the blender jars. Patrons can gather around the engine. The operation of the engine entertains patrons while they wait for their blended drinks. This allows the beverage concession operator to retain a longer line since the novelty of a motorcycle engine provides a diversion while patrons are waiting for their drinks. The quiet rumbling of the motorcycle engine soothes the impatience inherent in thirsty customers.

As different motorcycle companies produce different engines, the engine on display can be changed to the latest engine. Alternatively, antique motorcycle engines can also be reused and mounted on display. The engine modularly exchanges between the first engine and subsequent engines. Different motorcycle engines will have different sounds. It is preferred to have a motorcycle engine that has a quiet rumbling sound so as not to annoy and drive away customers.

Since most motorcycle engines have between about 60 hp and 150 hp, six blended drink stations can be powered at a time so that each station has between about 10 hp and 20 hp. With transmission losses, a motorcycle engine powered blended drink station should have at least 10 hp. Even though 10 hp might not be enough to power a motorcycle, it would be enough to blend a blended drink and crush ice to make drinks such as smoothies, ice blended mochas and Margaritas.

BRIEF DESCRIPTION OF THE DRAWINGS

FIG. 1 is a perspective view of the present invention.
The following call a list of elements provides a reference for finding different elements.
20 Countertop
21 Motorcycle Gearshift Control
22 Shifter
25 Multiple Speed Motorcycle Engine
26 Motorcycle Engine Belt
27 Grooved Pulley
31 First Gear Box
31 Intermediate Gear Box
32 Intermediate Drive Shaft
33 Main Shaft
40 Main Pulley
60 Belt System
61 Rear Belt Portion
62 Middle Belt Portion
63 Front Belt Portion
68 Blender Drive Shaft
70 Blender Drive Pulley
80 Blender Connection
81 Blender Jar
82 Blender Blade
83 Blender Shaft
88 Counter Top Instrument Gauge

DETAILED DESCRIPTION OF THE PREFERRED EMBODIMENT

The gasoline powered five speed motorcycle engine 25 has a gearshift control 21 mounted on a shifter 22. The shifter 22 looks like a portion of a handlebar, and is a motorcycle control. The shifter controls the shifting of the motorcycle and also has a clutch and a brake. A variety of functional decorations can improve the look of the device. The shifter optionally has a button at an apex of the shifter that can activate propane fueled flames that come out of exhausts for additional visual effect. When the button is pushed on the top of the shifter, flaming propane is injected into the exhaust. Another decoration would be a pair of non-rotating motorcycle handlebars that can optionally be mounted in view with the motorcycle engine 25 where the starter and kill switch or optionally the throttle control can be seen. The engine controls such as the starter, kill switch or gearshift control can optionally be mounted in a variety of locations including on the shifter 22 or on the handlebars in traditional motorcycle operation configuration.

The motorcycle engine drives a motorcycle engine belt 26 that is located within and extends from the housing of the engine. The motorcycle engine belt 26 has a plurality of grooves on the motorcycle engine belt inside surface. A grooved pulley 27 that is external to the engine housing receives the motorcycle engine belt 26. As the motorcycle engine 25 increases in revolutions per second, the motorcycle engine belt 26 and grooved pulley 27 also increase in revolutions per second. Main shafts 33 transmit the force from the grooved pulley 27 to a first gear box 30. The first gear box transmits force to other main shafts 33 which transmit motion to one or more intermediate gearboxes 31. The intermediate gearbox 31 drives an intermediate drive shaft 32. Preferably, the intermediate drive shaft 32 is located within the intermediate gearbox 31. The intermediate drive shaft 32 drives a main pulley 40. The main pulley is attached to a belt system 60. The belt system includes a rear belt portion 61, a middle belt portion 62, and a front belt portion 63. A plurality of blender drive pulleys 70 receive the belt at the front belt portion 63, the middle belt portion 62 and the rear belt portion 61 to transmit motion to rotate a plurality of blender drive shafts 68. The blender drive shaft 68 is connected to the blender connection 80 which is mounted approximately flush with the countertop 20. The blender connection 80 rotates the blender shaft 83 of the blender jar 81 which rotates the blender blade 82. The countertop instrument gauge 88 provides information such as revolutions per minute on tachometer, gas tank status on a gas gauge and output for sensors such as heat sensors on a temperature gauge.

The motorcycle engine is preferably a five-speed custom motorcycle or Harley-Davidson style engine that is mounted in view at the front of the counter so that patrons can see, hear and be entertained by the operation of the engine while waiting for blended drinks. Because a typical motorcycle engine has anywhere between about 60 up to 120 horsepower, the signal motorcycle engine should be capable of operating up to at least six blended drink stations simultaneously. Although a smaller engine could mechanically be used instead of a motorcycle engine, this is really not advisable because the smaller engine especially if it is a two-stroke engine would have a higher pitch and lack the familiar soothing rumbling sound of a motorcycle engine. The motorcycle engine should be a stock engine that is typically installed on motorcycles. Motorcycle enthusiasts readily recognize stock motorcycle engines, whether these engines are designed for the custom market, or whether they are with a major brand such as Harley-Davidson, or Honda. Therefore, it would defeat the purpose of this invention to display a small dinky engine such as a lawnmower engine. Used engines can be mounted on the motorcycle display area and the engines do not have to be new.

The engine should be mounted on a motorcycle display area, such as inside an acrylic box built into the counter, a recess on the counter, or directly mounted to the top of the counter. The best mode is to have a recess on the counter without a protective transparent box so that customers can listen to the natural sound of the motorcycle engine preferably at or below eye level. The motorcycle display area should be appropriately decorated according to the theme of the motorcycle engine. Because the motorcycle engine is an actual stock engine designed for either a custom builder or a for a more well known major brand, the motorcycle engine will have gauges and instruments which are commonly associated with the motorcycle engine. Preferably, the instruments are mounted on the counter, or on the platform that holds the motorcycle display area in view of the patrons. Thus, the patrons would be able to see and be entertained by counter top instrument gauges 88 such as the tachometer, and fuel gauge while waiting. A second set of instruments can face the inside area of the counter so that the motorcycle engine operator can keep track of motorcycle engine operation. The instruments should be gauges 88 and the gauges can have trim such as chrome trim to enhance visual appearance.

The motorcycle gearshift control 21 mounted on the motorcycle shifter 22 should also match the stock motorcycle engine 25 in that if the motorcycle engine is of a specific brand, the motorcycle gearshift control 21 and motorcycle shifter 22 should also match the brand. The motorcycle shifter preferably protrudes from the counter. The other end of the motorcycle shifter typically seen in normal motorcycle operation could be mounted in a different location, or kept together with the motorcycle shifter 22. Because the fuel system and cooling system for a motorcycle engine is well known in the art, the installation of these systems is not further described herein. The motorcycle engine belt 26 is preferably grooved so that it matches the grooved pulley 27. The grooved pulley is mounted with a horizontal axis of rotation so that a first main shaft 33 drives a first gear box 30. The first gearbox 30 has gears at right angles to transmit force sideways to the left and right of the first main shaft 33. A variety of gearing configurations can accomplish the right angle force transmission and are also readily commercially available. These gearboxes may include a variety of worm gears, bevel gears or spur gears in a number of different configurations. Gear ratio can also be adjusted by selecting gears so that the motorcycle engine revolution speed can be matched to the blade speed.

Optionally, the first gearbox 30 further drives other main shafts 33 that drive an intermediate gearbox 31. The intermediate gearbox 31 preferably has a vertical intermediate drive shaft 32 having a vertical axis of rotation that drives a main pulley 40 also having a vertical axis of rotation. The intermediate drive shaft 32 is preferably welded to the main pulley 40, and both are preferably made of steel. If the intermediate gearbox 31 provides a rotation of the belt system 60, the belt preferably has three sections. The belt system 60 is connected to a number of blender drive pulleys 70. A rear belt section 61 transmits force to the rear blender drive shaft 68. The middle belt portion 62 transmits force to the middle blender drive shaft 68. The front belt portion 63 transmits force to the front blender drive shaft 68.

The belt system 60 has a thickness of approximately between one and three inches in height. The belt system 60 moves in a horizontal direction which is parallel to the ground. The motion of the belt generates force so that the main pulley 40 and the blender drive pulley 70 are preferably mounted on a number of axle bearings to reduce friction. The belt system 60 can be made of three separate belts, each engaging with an adjacent blender drive pulley 70. In the multiple belt embodiment, the three separate belts each engage a blender drive pulley 70 that has space for multiple belts so that the belts do not overlap and interfere with each other. The single belt embodiment is also possible where the single belt drives two or three blender drive pulley 70.

The belt system 60 should be a smooth belt system not having grooves. Thus, if failure occurs on a section of the apparatus, the force can be alleviated by belt slipping. Belt system to pulley friction need not be high. Also, a single pulley such as the main pulley 40 or one of the other pulleys can have limited friction to allow belt slipping in case of mechanical failure or mechanical jamming. If the countertop or the side of the counter facing the audience is transparent, patrons can see the mechanical operation of the belt and pulley system. Patrons would also be able to see the rotating force transmitting shafts. The belt and pulley system is preferably of the type that is typically installed on motorcycles so as to be consistent with the overall aesthetic theme.

The blender connection 80 is a typical blender top portion that attaches to the blender. The blender connection 80 is often made of a rubber or elastomeric material to absorb shock. Force is transmitted in the middle of the blender connection 80 by a gear that meets with the gearing at the bottom of the blender. The coupling between the bottom of the blender and the blender connection 80 is preferably a metal connection with the blender shaft 83 protruding from the bottom of the blender matching the gearing of the blender connection 80. The blender connection 80 has a top portion visible to the blender operator. The blender connection 80 also has a bottom portion which is mounted below the counter. The bottom portion receives the blender drive shaft 68 and the transmits the motion from the blender drive shaft 68 to the gearing at the blender connection 80.

A variety of commercially available blenders can be fitted for operation in this manner. Commercial countertop blenders can be disassembled with the blender coupling retained on the blender connection 80 so that the blender coupling is driven by the blender drive shaft 68 instead of the electrical motor that the commercial countertop blender is typically driven by. Instead of cannibalizing parts from store-bought or commercial electric motor blenders, the coupling and blender connection 80 can be manufactured separately. In any case, the structure and operation of blenders is widely known in the industry. For example, Boyce in the U.S. Pat. No. 4,487,509 issued Dec. 11, 1984 (the disclosure of which is incorporated herein by reference) provides a portable blender having a drive assembly and removable mixer portion. The benefit of using parts from a store-bought electric blender might be the availability of options such as strainer and stirrer options as shown in U.S. Pat. No. 3,417,972 to C. Vincent issued Dec. 24, 1968 (the disclosure of which is incorporated herein by reference). More recent blender technology such as a spout and stirring stick would be available with more recent store-bought electric blenders such as that shown in Daniels Jr. U.S. Pat. No. 7,213,965 issued on May 8, 2007 (the disclosure of which is incorporated herein by reference). A wide variety of different store-bought blenders would provide a great variety and selection of different features that a motorcycle engine powered blender drink station operator would want.

Because the blender jar 81 is removable from the blender connection 80, the system can run with none or all or some blender jar 81 attached to the blender connection 80. The blender jar 81 can be made of plastic such as polycarbonate or glass. Instead of a blender, a retro look juice extractor or other type of rotating food processor could be utilized, such as that shown in U.S. Pat. No. 2,315,018 issued on Dec. 28, 1939 to Lawrence (the disclosure of which is incorporated herein by reference). A modern juicer could also replace the blender jar 81. An example of a modern juicer is shown in U.S. Pat. No. 7,089,851 issued on Aug. 15, 2006 to Areh (the disclosure of which is incorporated herein by reference). Juicers and a juice extractors are just as easy to disassemble. It would be easy to replace the electric motor of these store-bought devices with direct shaft engagement to the blender drive shaft 68. The blender drive shaft 68 can be welded or otherwise connected to the main shaft of the juicer devices. As an accessory to the juicer devices food processors such as the prolific and very popular food processor shown in U.S. Pat. D345,079.

To make a blended drink, the operator loads the blender jar and then shifts the motorcycle engine into a first gear and then starts the motorcycle engine. For chopping and mixing, the motorcycle engine is at low gear. The motorcycle engine increases to a higher gear to puree the blended drink. After the drink is blended, the motorcycle engine may remain in idle or may be deactivated. Preferably, the blended drinks are loaded and processed in batches so that each cycle of the engine blends six drinks at a time if the total number of blender connections 80 is six. Because of the power of the motorcycle engine, the blade speed can be high such as up to 14,000 or 20,000 revolutions per minute. Of course, the tachometer on the counter provides a readout to the customers to further entertain them by showing the motorcycle engine speed. The operator must take care to operate the system in an open-air environment, since the motorcycle engine can generate lethal carbon monoxide exhaust in indoor situations. Also, the operator must take care to decrease the system speed as soon as the mixed drinks are ready so that the kinetic energy of the blade input does not heat up the drinks.

After creating the mixed drink, the operator decreases the system speed. An optional motorcycle braking system can be installed anywhere on the system such as at the first gearbox so that a blender operator can decrease the speed of the system. Optionally, the blender operator can downshift the five speed motorcycle engine so that the speed of the system is decreased. The blender operator can also turn off the motorcycle engine to have a zero speed. The blender operator can also decrease the gearshift control so that the system decreases in speed. Thus, system speed is operated very similarly to a motorcycle, since an actual motorcycle engine is being used. A motorcycle clutch can also be used to selectively disengage the main shaft 33 from mechanical connection to the first gearbox 30. A motorcycle clutch can also be used to selectively disengage the intermediate drive shaft 32 from the intermediate gearbox 31. Thus, there are a wide number of methods to decrease system speed after drinks are prepared.

After the event, the motorcycle engine powered blender station is shut down and towed away easily as it is mounted on a bed of a trailer. The bed of the trailer forms the floor where the operator stands in the middle between the counter top portions 20. A door allows the operator to exit the motorcycle engine powered blender station. The trailer has a number of enclosing panels which are lowered over the side faces of the countertop 20 providing an enclosure for the motorcycle engine powered blender station. Once the trailer gets on the road, it is preferably towed by a truck immediately to the next motorcycle enthusiast gathering for serving blended drinks to thirsty revelers.

The invention claimed is:

1. A blended drink concession apparatus comprising:
  a. a motorcycle engine having a housing, the engine mounted in a motorcycle engine display area;
  b. a motorcycle drive belt powered by the motorcycle engine; the belt located within and extending from the engine housing;
  c. a motorcycle pulley external to the housing and driven by the belt;
  d. a shaft powered by the motorcycle pulley;
  e. a belt powered by the shaft;
  f. a blender shaft powered by the belt;
  g. a blender connector powered by the blender shaft;
  h. a blender jar having blender blade powered by the blender shaft connector,
  wherein the motorcycle pulley is a grooved pulley, wherein the drive belt has a plurality of grooves engaging with the grooved pulley, wherein the grooved pulley is mounted with a horizontal axis of rotation.

2. The blended drink concession apparatus of claim 1, further comprising a second blender shaft powered by the belt, a second blender connector powered by the second blender shaft, a second blender jar having a second blender blade powered by the second blender shaft.

3. The blended drink concession apparatus of claim 2, further comprising a third blender shaft powered by the belt, a third blender connector powered by the third blender shaft, a third blender jar having a third blender blade powered by the third blender shaft.

4. The blended drink concession apparatus of claim 3, further comprising a fourth blender shaft powered by the belt, a fourth blender connector powered by the fourth blender shaft, a fourth blender jar having a fourth blender blade powered by the fourth blender shaft; further comprising a fifth blender shaft powered by the belt, a fifth blender connector powered by the fifth blender shaft, a fifth blender jar having a fifth blender blade powered by the fifth blender shaft.

5. The blended drink concession apparatus of claim 3, further comprising a counter mounted tachometer.

6. The blended drink concession apparatus of claim 3, further comprising a motorcycle engine shifter control.

7. A blended drink concession apparatus comprising:
   a. a motorcycle engine having a housing, the engine mounted in a motorcycle engine display area, wherein the motorcycle engine is between about 60 hp and 150 hp;
   b. a motorcycle drive belt powered by the motorcycle engine; the belt located within and extending from the engine housing;
   c. a motorcycle pulley external to the housing and driven by the belt;
   d. a shaft powered by the motorcycle pulley;
   e. a blender shaft powered by the shaft;
   f. a blender connector powered by the blender shaft;
   g. a blender jar having blender blade powered by the blender shaft connector.

8. The blended drink concession apparatus of claim 7, further comprising a second blender shaft powered by the belt, a second blender connector powered by the second blender shaft, a second blender jar having a second blender blade powered by the second blender shaft.

9. The blended drink concession apparatus of claim 8, further comprising a third blender shaft powered by the belt, a third blender connector powered by the third blender shaft, a third blender jar having a third blender blade powered by the third blender shaft.

10. The blended drink concession apparatus of claim 9, further comprising a fourth blender shaft powered by the belt, a fourth blender connector powered by the fourth blender shaft, a fourth blender jar having a fourth blender blade powered by the fourth blender shaft; further comprising a fifth blender shaft powered by the belt, a fifth blender connector powered by the fifth blender shaft, a fifth blender jar having a fifth blender blade powered by the fifth blender shaft.

11. The blended drink concession apparatus of claim 9, further comprising a counter mounted tachometer.

12. A blended drink concession apparatus comprising:
   a. a multiple speed motorcycle engine having a housing, the engine mounted in a motorcycle engine display area,
   b. a motorcycle engine shifter control for shifting the motorcycle engine during operation;
   c. a motorcycle drive belt powered by the motorcycle engine; the belt located within and extending from the engine housing;
   d. a motorcycle pulley external to the housing and driven by the belt;
   e. a shaft powered by the motorcycle pulley;
   f. a blender shaft powered by the shaft;
   g. a blender connector powered by the blender shaft;
   h. a blender jar having blender blade powered by the blender shaft connector,
   wherein the motorcycle pulley is a grooved pulley, wherein the drive belt has a plurality of grooves engaging with the grooved pulley, wherein the grooved pulley is mounted with a horizontal axis of rotation.

13. The blended drink concession apparatus of claim 12, further comprising a second blender shaft powered by the belt, a second blender connector powered by the second blender shaft, a second blender jar having a second blender blade powered by the second blender shaft.

14. The blended drink concession apparatus of claim 13, further comprising a third blender shaft powered by the belt, a third blender connector powered by the third blender shaft, a third blender jar having a third blender blade powered by the third blender shaft.

15. The blended drink concession apparatus of claim 14, further comprising a fourth blender shaft powered by the belt, a fourth blender connector powered by the fourth blender shaft, a fourth blender jar having a fourth blender blade powered by the fourth blender shaft; further comprising a fifth blender shaft powered by the belt, a fifth blender connector powered by the fifth blender shaft, a fifth blender jar having a fifth blender blade powered by the fifth blender shaft.

16. The blended drink concession apparatus of claim 14, further comprising a counter mounted tachometer.

* * * * *